UNITED STATES PATENT OFFICE.

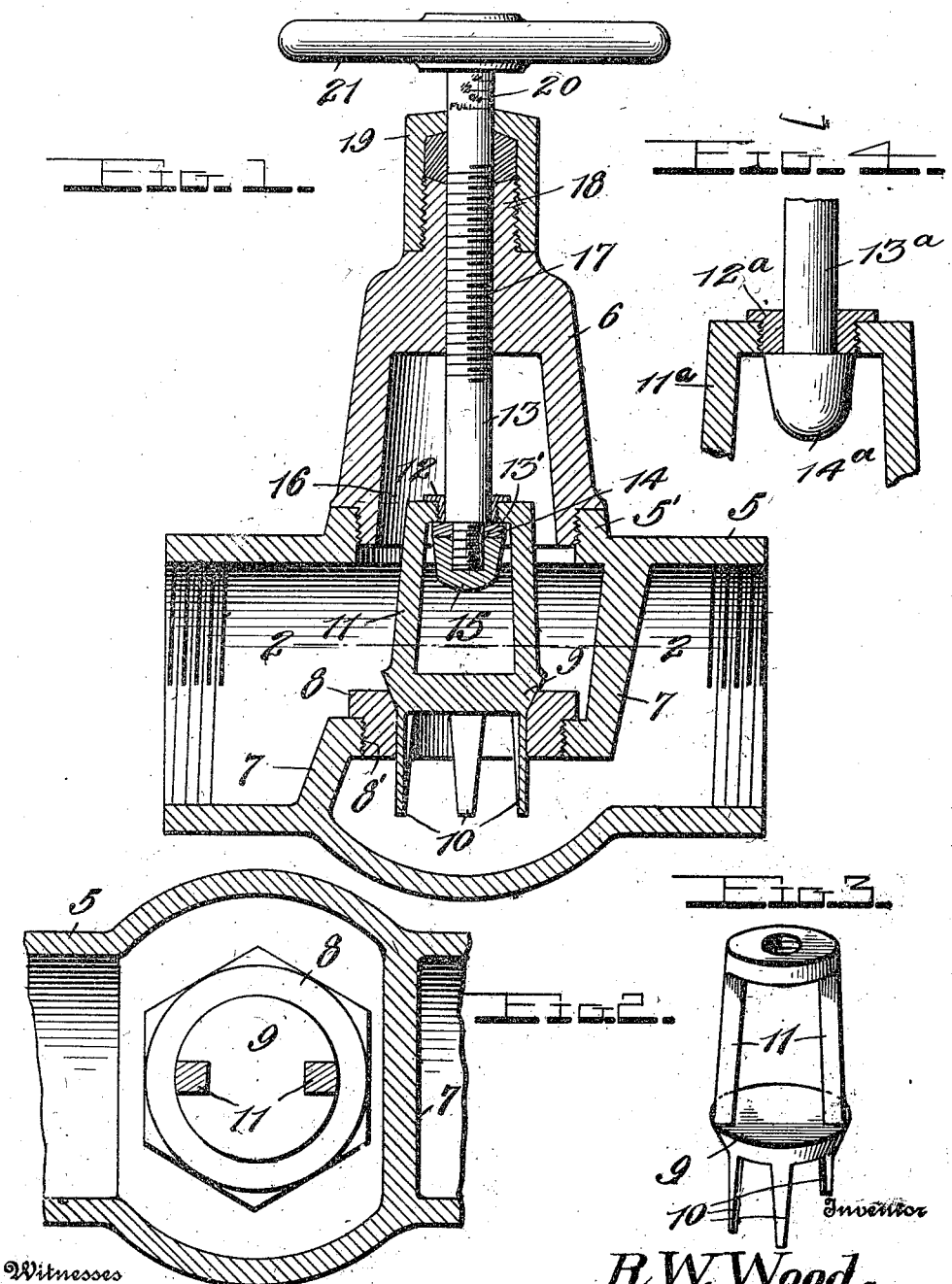

ROBERT W. WOOD, OF ASHTABULA, OHIO.

VALVE.

1,001,111.　　　Specification of Letters Patent.　　Patented Aug. 22, 1911.

Application filed November 21, 1910. Serial No. 593,537.

*To all whom it may concern:*

Be it known that I, ROBERT W. WOOD, a citizen of the United States, residing at Ashtabula, in the county of Ashtabula and State of Ohio, have invented certain new and useful Improvements in Valves, of which the following is a specification, reference being had to the accompanying drawings.

This invention relates to valves and more particularly to an improved check valve and has for its primary object, the provision of means for raising the valve from its seat in the event that the same sticks or adheres thereto owing to the incrustation of the metal.

Another object of the invention is to provide means for regulating the extent of opening movement of the valve.

A still further object of the invention is to provide a check valve having a removable seat and a valve member for engagement upon said seat longitudinally movable upon a stem, said stem being threaded in the valve casing and longitudinally movable therein whereby the valve member may be lifted from its seat.

With the above and other objects in view, the invention consists of the novel features of construction, combination and arrangement of parts hereinafter fully described and claimed, and illustrated in the accompanying drawings, in which—

Figure 1 is a vertical longitudinal section of a check valve embodying my improvements; Fig. 2 is a section taken on the line 2—2 of Fig. 1; Fig. 3 is a detail perspective view of the valve member; and Fig. 4 is a detail section illustrating a slight modification of the connection of the valve member and the stem.

Referring in detail to the drawing, 5 designates the valve casing, said casing being formed with an interiorly threaded boss 5' to receive the right angularly extending plug 6. The casing 5 is formed with the inwardly extending walls 7 in which the valve seat 8 is threaded as indicated at 8', the inner ends of said walls being integrally connected and provided with a threaded opening in such connecting portion to receive the valve seat.

The valve member 9 which is normally disposed upon the seat 8, is formed with a plurality of depending scraping fingers 10. A yoke 11 is integrally formed upon the other face of the valve 9 and extends upwardly. The intermediate connecting portion of this yoke is formed with an opening in which a collar 12 is removably fixed. A valve stem 13 extends through the collar 12 and its lower end is reduced as shown at 13' and screw threaded to receive a nut 14. A jam nut 15 is also threaded upon this reduced end of the valve stem and is adapted for engagement by the valve member 9 to limit the upward movement of said member. The plug 6 which is threaded into the valve casing 5 is tubular in form to provide a chamber 16 which receives the valve member in its upward movement. The intermediate portion of the valve stem 13 is threaded as indicated at 17 for engagement in a threaded opening formed in the upper end of the plug 6. This plug is also formed upon its upper end with a reduced threaded portion 18 to receive the bonnet 19 in which suitable packing material may be arranged.

The valve member 9 is normally disposed upon the seat 8, the intermediate portion of the yoke 11 engaging upon the nut 14 threaded on the lower end of the stem 13. When the valve has been out of service for an extended length of time, incrustations form on the valve seat and the valve 9, owing to the corrosion of the metals and the valve becomes so firmly fixed in its seat that when the system in which the valve is used is again put into use, the pressure behind the valve will be insufficient to lift it from its seat. By means of my device as above set forth, it is only necessary to rotate the valve stem 13 to thread the same upwardly through the plug 6. The engagement of the nut 14 with the yoke 11 will pull or lift the valve member upwardly from its seat. In this upward movement of the valve, the lower ends of the tapered fingers 10 engage the walls of the valve seat 8 and scrape the same so as to remove the incrustations and permit of the close engagement of the valve member upon its seat when the pressure is cut off. Also, when the valve remains open for an extended length of time, the fingers 10 may adhere to the valve seat, and the valve member may be raised in the manner above described and the rotation of the valve stem then reversed to seat the valve. It will be observed that in the normal position of the valve and when the same is free to move longitudinally upon the stem 13, there is a greater space between the nut 14 and the upper end of the chamber 16 of the plug 6 than the space between the jam nut 15 to the valve 9 so as to permit of the upward movement of the valve until it engages said nut. This movement, however, is insufficient to dispose the lower ends of the scraping fingers 10 above the valve seat, so that said fingers will be properly disposed for movement through the valve seat when the valve member again descends. In order to regulate the extent of movement of said valve and to determine such movement in accordance with the pressure through the valve, the upper end of the stem 13 is provided with indicating marks or graduations 20. As shown in the drawing, these marks indicate a ¼, ½, ¾ and full opening movement of the valve member. The upper end of the valve stem is provided with a hand wheel 21 by means of which the same may be readily rotated and threaded through the plug 6. By turning the valve stem until the graduation mark indicating ¼ is in register with the upper edge of the opening in the bonnet 19, the lower end of the nut 15 will be so spaced from the valve member 9 that the valve will only be lifted one-quarter of its full movement. When the pressure is greater, the movement may be increased by simply adjusting the stem 13 through the plug.

In Fig. 4 a slight modification of the means for connecting the valve member to its stem is illustrated. In this form of the device, the valve stem is formed upon its lower end with a slotted head 14ª and between the upper ends of the arms of the yoke 11ª, the collar 12ª is threaded. The nuts 14 and 15 shown in Fig. 1 would only be required where the yoke is not provided with the threaded collar 12. In the modified construction the collar is of greater diameter than the head 14ª on the lower end of the stem so that by removing said collar, the stem may be threaded upwardly and disconnected from the valve member. Thus the valve may be readily removed for grinding.

While I have designated my improved valve, a check valve, it will be obvious that the principles of construction may be applied to any one of the many different varieties including cut-off valves, and blow-off cocks, without materially altering the construction or departing from the novel features of the invention.

From the above it is believed that the construction and manner of operation of my improved check valve will be readily understood. The device is extremely simple and of great convenience and serviceability. It will be apparent that the expense of maintaining such valves in a complicated piping system would be materially reduced by the use of my invention, as the valve members frequently become so closely engaged upon their seats that it is impossible for them to be lifted by the ordinary pressures. My invention provides a check valve which may be quickly seated or unseated by manual adjustment of the stem and the extent of movement of the valve member under pressure regulated as desired. By providing the valve with the removable seat, said seat may be easily and quickly replaced by a new one when the same becomes worn to such an extent that it can be of no further service. It will further be obvious, that the valve is extremely durable in practical use, no springs or other easily breakable elements being employed, and that it may also be manufactured at a comparatively low cost.

While I have shown and described the preferred construction and arrangement of the various parts, it will be understood that the device is susceptible of considerable modification without departing from the essential feature or sacrificing any of the advantages of my invention.

Having thus described the invention what is claimed is:—

In a valve of the character described, the combination with a valve casing having a valve seat therein, of a valve member normally arranged upon said seat, said member comprising upper and lower disks connected at diametrically opposite points by vertical arms, said lower portion of the valve member having a plurality of depending scraping fingers formed thereon to engage the valve seat, the upper portion of the valve member having a threaded bore, a chambered plug threaded into the valve casing, a valve stem having threaded engagement in said plug and movable longitudinally therethrough, a collar threaded into the bore of the valve member, said valve stem being loosely disposed through said collar and having a reduced screw threaded lower end disposed between the arms of said valve member, nuts threaded thereon to secure the valve member on the stem for vertical movement with respect thereto, said valve member being movable into the chamber of said plug, the length of the scraping fingers of said valve member being greater than the space between the lower body portion of said member and the nuts on the lower end of the valve stem, said lower portion of the valve member having an outwardly inclined seat engaging face.

In testimony whereof I hereunto affix my signature in the presence of two witnesses.

ROBERT W. WOOD.

Witnesses:
E. MASON,
TERESA MOTSKO.